Patented Nov. 13, 1945

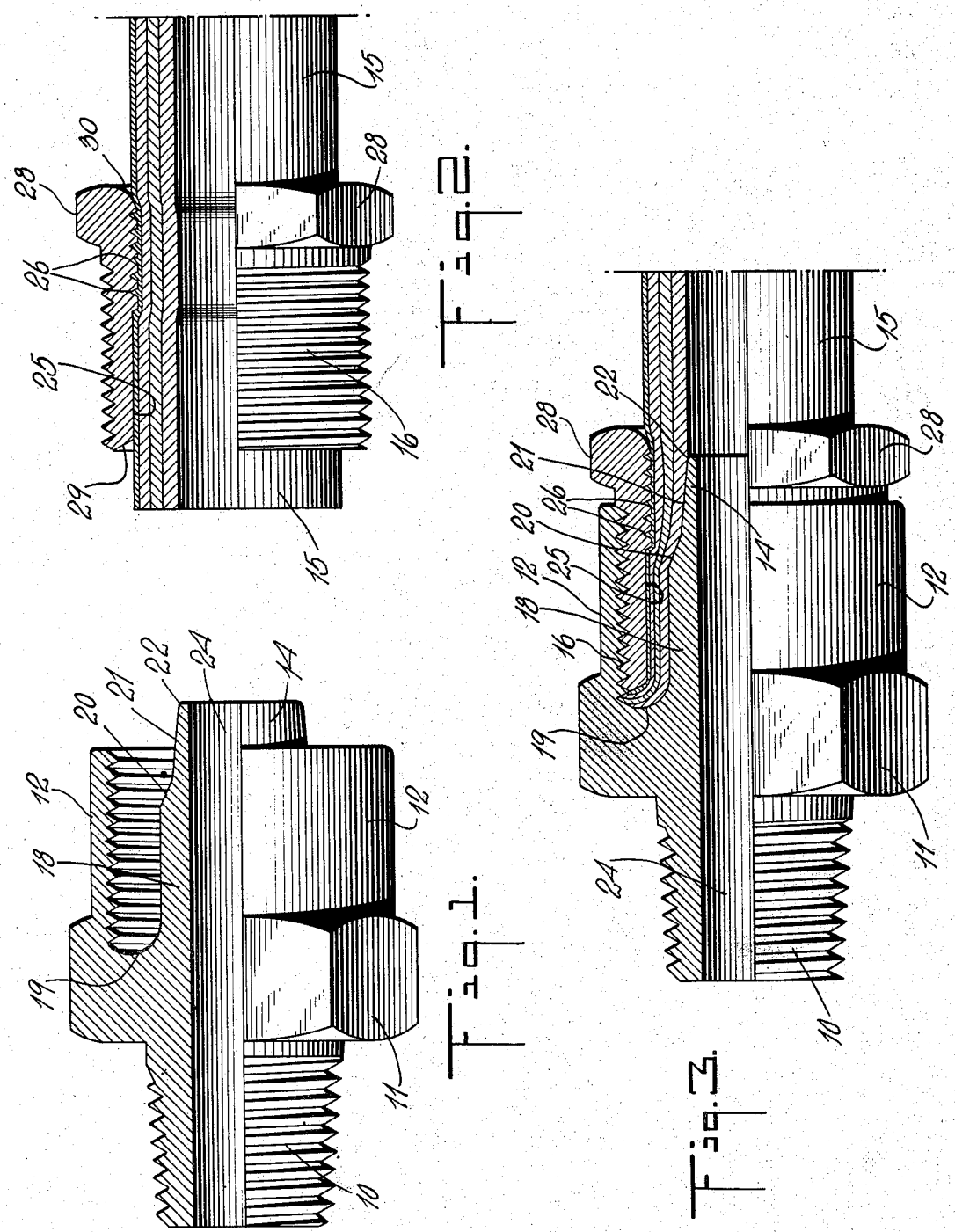

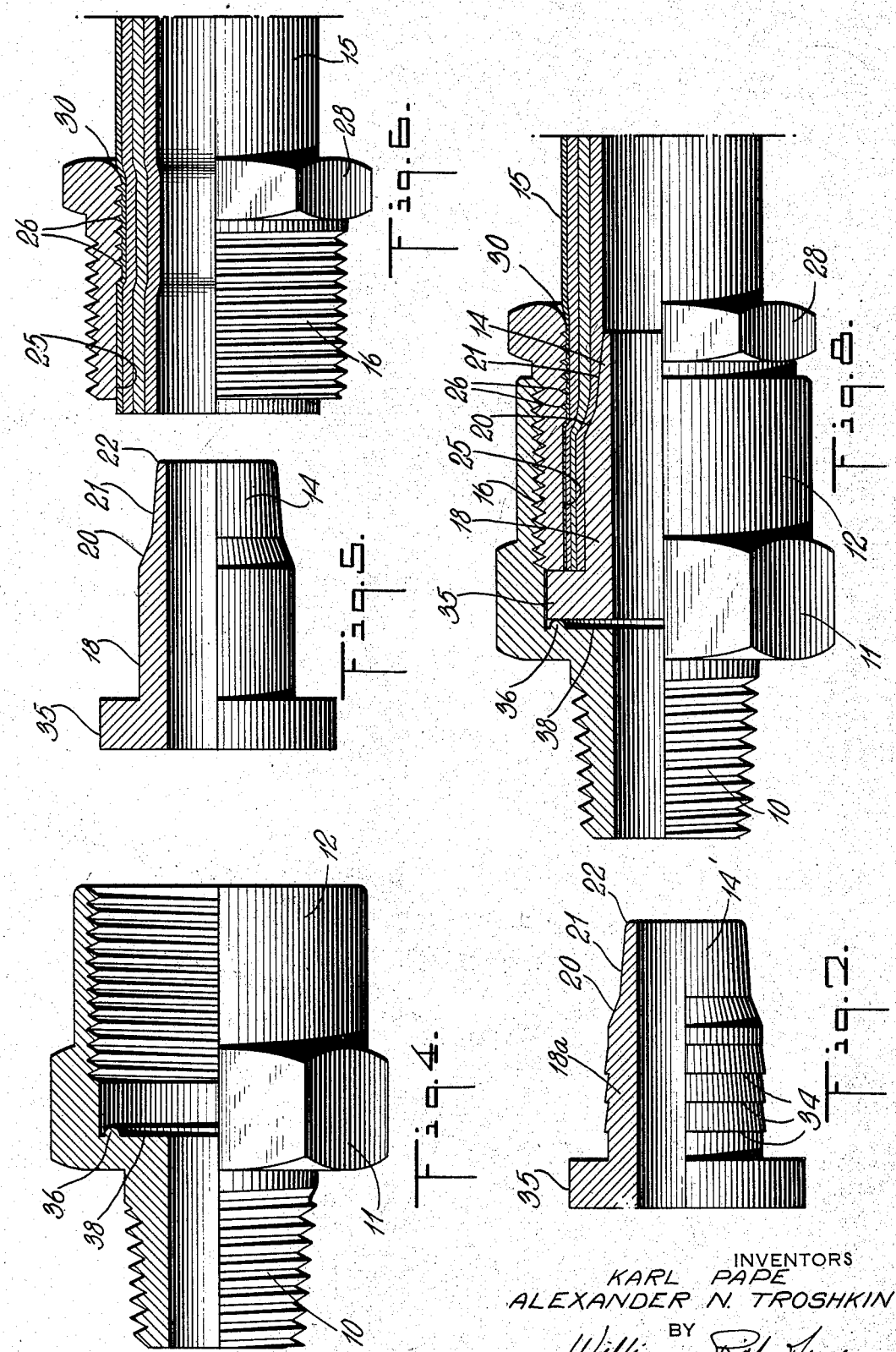

2,388,992

UNITED STATES PATENT OFFICE 2,388,992

HOSE COUPLING

Karl Pape, Dover, and Alexander N. Troshkin, Montclair, N. J., assignors to Resistoflex Corporation, Belleville, N. J., a corporation of New York Application March 31, 1944, Serial No. 528,990

1 Claim. (Cl. 285—86)

This invention relates to fittings or couplings for flexible hose, more particularly to fittings which may be quickly attached, detached and reused, without the use of any special tools.

Flexible tubing and hose are used for a variety of purposes such as gasoline, oil and hydraulic lines, instrument lines, compressed air and vacuum lines, etc. To enable and facilitate their connection to associated mechanisms they are equipped with fittings at their ends which usually have male or female threaded members for making such connections. These fittings must be leakproof and should secure the hose end in such manner that they will not blow off, or weaken the hose at the point where the coupling is applied so that it will fail, at pressures below the normal burst pressure of the hose itself, so that the full capacity of the hose to sustain pressure can be utilized.

In many applications it is desirable that a fitting be available which can be applied to a hose length cut from bulk in the field without requiring the use of special tools. Such fittings are known in the trade as the "quick-attachable" type and a variety of such fittings have been devised. Some require special tools for their use. Some are attachable but in the process of attachment some part of the fitting is deformed so that it is not reusable. Some have parts which may be assembled backward by unskilled labor with resulting decreased efficiency. Many of such fittings which have been developed for use with rubber or synthetic rubber hose are unsuitable for use with hose made in whole or in part of various recently developed plastics which have properties different from rubbers, such as less compressibility or elasticity or a tendency to "cold flow."

The objects of the present invention are to provide a quick attachable fitting which is easily assembled, which cannot be assembled with any part reversed, which can be easily removed and reused, no part having been deformed in the process of attachment, which is particularly adapted for use with hose incorporating a layer of non-rubber plastic material, and which will be leakproof and not weaken the hose.

Other objects and advantages will in part be obvious from and in part will appear in the course of the following description of the present preferred embodiments of the invention, taken in conjunction with the drawings in which:

Fig. 1 shows, in half section, the coupling part of a 2-piece fitting;

Fig. 2 is a similar view of the collar which is the second part thereof, applied to the end of a hose;

Fig. 3 shows the hose end assembled in the 2-piece fitting of Figs. 1 and 2;

Figs. 4, 5 and 6 are, respectively, the coupling part, separate shank member and collar of a 3-piece fitting, the collar being applied to a hose end;

Fig. 7 shows a modification of the shank of Fig. 5 having a serrated surface; and Fig. 8 shows the 3-piece fitting assembled on a hose end.

Referring to Fig. 1, the coupling part of the 2-piece fitting may readily be machined from hexagonal bar stock and has a threaded nipple 10 by means of which the hose assembly is fastened to some other mechanism. For this nipple, which is not part of the invention, there may be substituted any other suitable type of coupling, such as an internally threaded part, a swivel coupling or the like. Adjacent the nipple 10 a segment of the bar stock is left intact to provide a hexagonal head 11 which may be gripped by a wrench. Extending outwardly from the head is an internally threaded sleeve 12 and a shank 14, the shank preferably extending a short distance beyond the end of the sleeve 12 as shown. The sleeve and shank define between them an annular chamber for receiving the hose end 15 and the externally threaded portion 16 of the collar, both shown in Fig. 2.

The shank 14 has a cylindrical inner portion 18 which extends outwardly from the bottom of the annular chamber a substantial distance, merging at its inner end with the outwardly flared bottom 19 of the chamber and at the other end with the tapered surfaces 20 and 21 of the outer portion of the shank which gradually decreases in diameter to the rounded nose 22 which is about of the same diameter as the inside diameter of the hose 15. It will be noted that this tapered end of the shank gradually increases in diameter from the nose 22 throughout the slightly tapered surface 21 and more rapidly increases in diameter throughout the tapered surface 20 which constitutes a conical step.

The coupling part shown in Fig. 1 has a straight cylindrical bore 24 extending throughout its length, which may be of substantially the same size as the bore of the hose 15 so that there will be substantially full flow of fluid through the fitting.

The collar shown in Fig. 2 has a smooth cylindrical bore 25 of substantially the same diameter as the outside of the hose, adjacent which, at the outer end of the collar, there are a plurality of inwardly extending projections, preferably in the form of screw threads 26. Alternatively the collar may be internally threaded throughout its entire length in which case it is so dimensioned relative to the hose as to enable the collar to be screwed onto the hose and yet grip it with sufficient firmness to draw it over the shank. At the outer end of the collar it is provided with wrench-gripping surfaces 28 and the collar is chamfered at each end as shown at 29 and 30. Externally, except for the surfaces 28, the collar has a threaded cylindrical surface adapted to be screwed into the sleeve 12.

To assemble this 2-piece fitting on a hose end the collar of Fig. 2 is first applied to the hose, the screw threads 26 making it possible to screw it on the hose end, the threads acting to draw the collar along the hose and firmly gripping it. This collar should be positioned as shown in Fig. 2 with a short section of the hose end 15 protruding. The end of the shank 14 is then pressed into the hose end, which may easily be done because the surface 21 has only a slight taper, until one or two of the external threads of the collar are engaged with the internal threads of the sleeve 12, after which the two parts of the coupling may be forcibly drawn together by a pair of wrenches or other gripping means applied to the surfaces 11 and 28.

Fig. 3 shows the completely assembled fitting and it will be observed that the collar has drawn the hose 15 over the shank 14, the end of the hose having been flared outwardly by the surface 19 over the end of the collar. The hose is gradually compressed from the nose 22 throughout that part which surrounds the tapered surfaces 20 and 21, reaching its maximum compression at the outer end of the cylindrical portion 18 of the shank. As shown, the diameter of the cylindrical portion 18 of the shank is intermediate the inside and outside diameters of the hose, being about midway between them in this embodiment. This effects an outward radial compression of the hose, when it is drawn over this portion, against the inside of the collar which closely fits the outside of the unstressed hose. The relative dimensions of the hose and shank may be varied to secure the optimum pressure for any particular hose construction. Between the smooth bore 25 of the collar and the cylindrical portion 18 of the shank the hose end is compressed uniformly over a considerable portion of its length and thus the hose is nowhere subjected to a concentrated pressure tending to weaken or damage it by cutting into it or causing it to cold flow. The hose will be so securely held between the surfaces 18 and 25 that there is no possibility of leakage or of the hose being blown out of the fitting by any pressure that would not burst the hose at some other point. By reason of the end of the hose having been flared outwardly, it is also clamped at the bottom of the annular chamber by the end of the collar, thus effecting a secondary locking.

During the assembling operation there must be some relative rotation between the hose and either the collar or the shank. In practice, the hose and the collar will normally remain stationary relative to each other if properly dimensioned and particularly if some lubricant is applied to the shank 14. As a further refinement, however, the threads 26 on the inside of the collar may have a left-hand pitch, where the internal threads of the sleeve 12 have a right-hand pitch, or vice versa, so that if there is any rotation between the hose and the collar during the assembling operation it will tend to draw the hose further through the collar instead of causing it to back out of it.

Instead of having two distinctly different tapers on the surfaces 20 and 21 of the shank, there may be a single graduated taper from the cylindrical portion 18 to the nose 22 or this part of the shank may be curved in cross-section instead of being made up of conical surfaces. Any of these alternative forms will serve the purpose of permitting easy insertion of the shank into the hose far enough to engage the threads of the sleeve and collar, the screwing together of these parts effecting the drawing of the hose over the larger part of the shank.

It will be noted that during the assembling of the two parts of the fitting above described, no part thereof is deformed. Hence the coupling may be removed by unscrewing its parts and reused on another piece of hose.

Figs. 4, 5 and 6 show a modification in which the shank is made separate from the coupling part comprising the sleeve. This may be desirable for various reasons. For example, in threading the sleeve 12, where the shank is integral therewith, it is necessary to use a hollow tap which is unduly subject to breakage and it may also be difficult to thread the sleeve all the way to the bottom of the annular chamber. It may also be desirable to provide serrations 34 on the cylindrical portion 18a of the shank as shown in Fig. 7, which is a difficult operation, particularly in a small fitting, if it must be done by tools capable of entering the annular chamber. For these and other reasons the shank may be made as a separate part as shown in Figs. 5 and 7 and provided with a flange 35 which seats against an annular rib 36 provided on the inwardly extending end wall 38 of the coupling part of Fig. 4. This 3-piece fitting may be assembled by seating the flange 35 against the rib 36 and proceeding in the manner explained above in connection with the fitting of Figs. 1 and 2, the only differences being that the collar is applied to the hose end so that the end of the hose extends but slightly beyond the end of the collar, as shown in Fig. 6, and the end of the collar which is adjacent the hose end is not chamfered. The reason for extending the hose end slightly beyond the collar is to assure that it will be firmly pressed against the flange 35 when the fitting is assembled. In drawing the hose over the shank there may be a slight displacement of the hose end toward the head of the collar or a distortion of the hose which would leave a space between it and flange 35, unless proper allowance is made for this possibility. Of course, the separate flange 35 may be provided with a flared surface similar to the surface 19 at the bottom of the annular chamber, as shown in Fig. 1, and the secondary locking feature obtained as in Fig. 3.

The assembled 3-piece fitting is shown in Fig. 8, from which it will be seen that the collar, pressing against the flange 35, forces it against the rib 36, making a tight seal between the coupling part and the separate shank member. Since the annular rib 36 has substantially a line contact with the face of flange 35 and these parts are made of relatively soft metal such as brass or aluminum, the rib 36 pressing against the face of flange 35 will form a fluid-tight seal.

The foregoing detailed descriptions of embodiments of the invention are to be considered merely as illustrative of the invention which is to be construed broadly within the purview of the claim.

What is claimed is:

A reusable quick-attachable coupling for attachment to a compressible flexible hose end, comprising a rigid cylindrical collar externally threaded throughout the major portion of its surface and provided at one end with a wrench-receiving portion, said collar having a bore a portion of which is smooth and cylindrical and adapted to closely surround said hose end when in an unstressed condition and another portion of which is provided with screw threads adapted to grip the hose and facilitate application of the collar to the hose end, a coupling part having a wrench-receiving portion and an internally threaded cylindrical sleeve adapted to receive the externally threaded portion of said collar and having a shank centrally located within said internally threaded sleeve and projecting beyond the end of the latter, said shank being tapered at its outer end to a diameter approximating the inner diameter of the hose for easy insertion therein and having a diameter at its inner end intermediate the inside and outside diameters of the hose and adapted to expand the hose outwardly tightly against the unthreaded inside portion of said collar when the hose is drawn over said shank, the tapered portion of said shank having a smooth surface to facilitate drawing of the hose end thereover, said threaded sleeve and said shank being so formed that they define between them an annular chamber having an outwardly flared end wall, whereby by screwing the collar on to the hose with the end of the hose extending beyond the inner end of said collar and by screwing said internally threaded sleeve of the coupling part and said externally threaded collar together the hose will be drawn over said shank, turned outwardly under the inner end of said collar by said flared end wall of said annular chamber and compressed between said end wall and the inner end of said collar.

KARL PAPE.
ALEXANDER N. TROSHKIN.